Sept. 12, 1967 A. MINCUZZI 3,340,703
FLEXIBLE TRANSMISSION MEANS
Filed Sept. 13, 1965
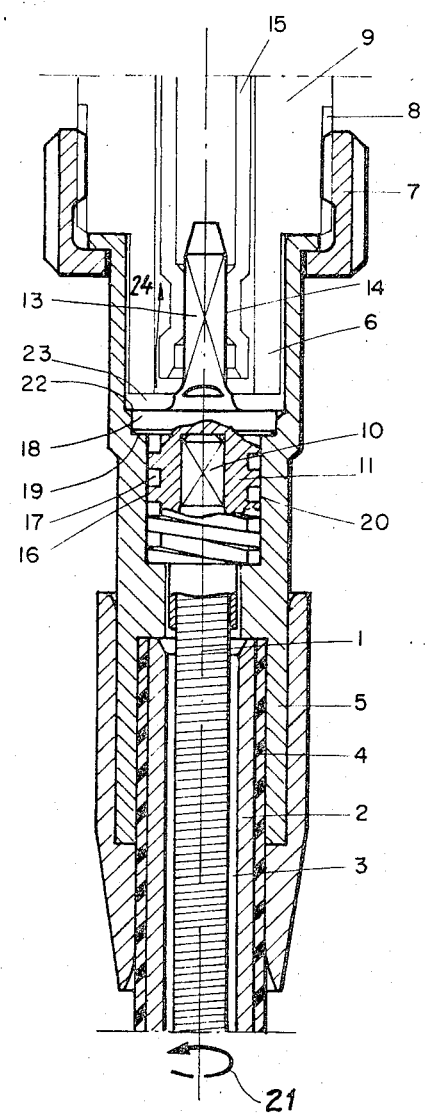
Inventor
ANTONIO MINCUZZI
By Young & Thompson
Attorneys

United States Patent Office 3,340,703
Patented Sept. 12, 1967

3,340,703
FLEXIBLE TRANSMISSION MEANS
Antonio Mincuzzi, Milan, Italy, assignor to Soc. per Azioni Fratelli Borletti, Milan, Italy, an Italian company
Filed Sept. 13, 1965, Ser. No. 486,795
Claims priority, application Italy, Sept. 12, 1964, 19,601/64, Patent 737,027
7 Claims. (Cl. 64—4)

ABSTRACT OF THE DISCLOSURE

Attachment means for a flexible transmission for a tachometer or speedometer, comprising a lubricated braid of wires wound into a helix of hand such that during driving rotation the helix tends to close, and an intermediate coupling member, between the flexible transmission and the tachometer, the lateral cylindrical surface of said member having helical grooves of opposite hand to that of the helix of the flexible transmission, so as to oppose the tendency of the rotating helical braid of wires to pump lubricant.

---

In automobiles, there are used for controlling the shaft of a tachometer or revolution counter of magnetic or centrifugal type, flexible transmission members that derive their motive power from a member of the transmission that controls the wheels, or from a member that rotates proportionally to the angular speed of the engine.

The flexible transmission member is constituted by a plurality of layers of steel wire which are wound in helical form one on another, and the number of which depends on the required diameter. The outer layer, generally the principal one, is wound in the direction such that when the transmission member rotates, the helix tends to close up, so as to ensure good operation of the said transmission member.

This direction of winding of the wire of the outer layer is however such that the said layer operates as a screw in relation to the grease that fills the internal space between the flexible transmission member and the cylindrical protective covering, which is also flexible, and therefore tends to shift the grease towards the measuring instrument.

Due to this effect, the grease is urged along the axis of the instrument and may penetrate into the interior of the instrument itself, causing irregular operation of the sensitive speed indicating element.

Various devices have been studied for eliminating this drawback. In general, however, they are excessively complicated and hence expensive, and also are not very efficient.

The said drawback is completely overcome by the device which is the subject of the present invention, which device is of simple and economical construction, and yet is reliable in operation. In the said device the square end of the flexible transmission member is coupled to the associated shaft of the measuring instrument via an intermediate member having a cylindrical outer surface which has at least one helical groove of hand opposite to that of the helix of the outer layer of the flexible transmission member, the said intermediate member also having, at each end, an extension of square section for engagement one with the hollow shaft of the instrument and the other with a recess of square section for engagement with the end of the flexible transmission member.

In this manner with the helical groove of the said intermediate member of contrary hand to that of the helix of the outer layer of the wires of the flexible transmission member, the grease caused to advance by the latter is urged towards the interior of the protective covering and hence cannot enter the instrument via the space between the shaft thereof and its seating. The said intermediate member is preferably formed by injection moulding, in one piece from plastics material, not requiring further treatment and thus being very economical to manufacture. The plastics material used may for example by nylon, Delrin or the like.

The invention will now be described in more detail with reference to the accompanying drawing, the single figure of which is a section on the axis of a flexible transmission member for an indicating instrument, showing also the attachment means therefor.

Referring to the drawing, a flexible transmission member 1 is guided in a protective sleeve 2, which is also flexible. Between these two parts is a space 3 filled with grease.

The sleeve 2, with an interposed plastic sleeve 4, is connected to a bushing 5 which is fixed on the end 6 of the measuring instrument and is held in position by a nut 7 which is screwed on a screwthread 8 formed on the body of a tachometer 9.

The end 10, of square section, of the flexible transmission member 1 is shrink fitted in the cavity of a part 11, which has, on the side opposite the said cavity an extension 13 which is also square and is adapted to be inserted into a recess 14, also of square section, in the shaft 15 of the measuring instrument.

The extension 13 may be slightly loose in to the recess 14 in the shaft 15 to adapt it to small variations that necessarily occur in working and mounting, as is the case with analogous couplings.

On the outer surface 16 of the member 11 is cut a helical groove 17 which is of opposite hand to that of the helix of the outer peripheral layer of the flexible transmission member 1.

Between the extension 13 and the cylindrical part 11 is provided a one piece flange 18 which prevents the base of the pin 13 from engaging on the mouth of the recess 14 in the shaft 15 of the measuring instrument, if at any time the flexible transmission member should slip.

The outer surface 16 is guided with slight play in the cavity 20 of the bushing 5.

As can easily be seen from the drawing, if the flexible transmission member 1 rotates in the direction of the arrow 21, the grease located in the chamber 3 tends to be moved towards the instrument. However, when the grease reaches the cavity 20 the helix 17 tends to move the grease in the opposite direction, thus preventing it from coming into contact with the flange 18 and passing into the interior of the instrument via the space 22 and the chamber 23 in the direction of the arrow 24.

What I claim is:
1. Attachment means for a flexible transmission member, of the type in which the said member is composed of a braid of wires wound into a helix of hand such that during normal forward rotation in one direction the helix tends to close, wherein the flexible transmission member, which is square ended, is coupled to a corresponding driven shaft via an intermediate member the outer cylindrical surface of which has at least one helical groove of opposite hand to that of the helix of the flexible transmission member.

2. Means according to claim 1, wherein the said intermediate member also has, at its respective ends, an extension of square section for engagement with a hollow seating of the driven shaft and a cavity of square section for engagement with the end of the flexible transmission member.

3. Means according to claim 1 wherein the said intermediate member has an annular flange adapted to abut against a corresponding seating, serving as a stop, in the body of a protective covering of the flexible transmission member.

4. Means according to claim 1, wherein the said intermediate member is made in one piece from plastic material.

5. Means according to claim 4 wherein the said intermediate member is made directly by injection moulding, without a subsequent working operation.

6. Means according to claim 1, wherein the said intermediate member is made from nylon.

7. Means according to claim 1, wherein the said intermediate member is made from Delrin.

References Cited

UNITED STATES PATENTS

| 2,370,884 | 3/1945 | Smith | 64—4 |
| 2,801,530 | 8/1957 | Holt | 64—3 |
| 2,884,771 | 5/1959 | Holt | 64—4 |

FOREIGN PATENTS

| 1,186,539 | 5/1959 | France. |

FRED C. MATTERN, JR., *Primary Examiner.*

HALL C. COE, *Examiner.*